United States Patent
Tsao et al.

(10) Patent No.: US 10,545,530 B2
(45) Date of Patent: Jan. 28, 2020

(54) APPARATUS AND METHOD FOR CONTROLLING CONTROLLABLE CLOCK SOURCE TO GENERATE CLOCK SIGNAL WITH FREQUENCY TRANSITION

(71) Applicant: MEDIATEK INC., Hsin-Chu (TW)

(72) Inventors: You-Ming Tsao, Taipei (TW); Chun-Liang Chen, Hsinchu (TW); Chen-Chia Lee, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 415 days.

(21) Appl. No.: 15/593,314

(22) Filed: May 11, 2017

(65) Prior Publication Data
US 2017/0248987 A1 Aug. 31, 2017

Related U.S. Application Data

(62) Division of application No. 14/325,368, filed on Jul. 8, 2014, now abandoned.

(60) Provisional application No. 61/858,742, filed on Jul. 26, 2013.

(51) Int. Cl.
*G06F 13/16* (2006.01)
*G06F 1/08* (2006.01)
*G06F 1/324* (2019.01)
*G06F 1/3296* (2019.01)

(52) U.S. Cl.
CPC ............... *G06F 1/08* (2013.01); *G06F 1/324* (2013.01); *G06F 13/1689* (2013.01); *G06F 1/3296* (2013.01); *Y02D 10/126* (2018.01)

(58) Field of Classification Search
CPC .................................. G11C 8/18; G11C 7/22

USPC .............................................. 365/193, 233.1
See application file for complete search history.

(56) References Cited

U.S. PATENT DOCUMENTS

| 6,172,537 | B1* | 1/2001 | Kanou | G06F 1/10 327/149 |
| 7,430,676 | B2 | 9/2008 | Baker | |
| 7,492,316 | B1* | 2/2009 | Ameti | G01S 5/0009 342/463 |
| 8,055,871 | B1 | 11/2011 | Schulze | |
| 2001/0014922 | A1* | 8/2001 | Kuge | G06F 13/1689 710/36 |
| 2002/0000925 | A1* | 1/2002 | Martin | G11C 27/02 341/122 |
| 2002/0152084 | A1* | 10/2002 | Main | H03M 3/41 704/500 |

(Continued)

FOREIGN PATENT DOCUMENTS

| CN | 1851821 A | 10/2006 |
| CN | 101388866 A | 3/2009 |

(Continued)

*Primary Examiner* — Michael T Tran
(74) *Attorney, Agent, or Firm* — Winston Hsu

(57) ABSTRACT

An electronic device includes a memory controller and a processor. The memory controller controls access of a memory device. The processor performs a calibration operation to find a first setting range of a memory controller parameter under a first clock frequency of the memory device, to find a second setting range of the memory controller parameter under a second clock frequency of the memory device, and to determine a calibrated setting of the memory controller parameter according to an overlapped range of the first setting range and the second setting range.

3 Claims, 4 Drawing Sheets

(56) References Cited

U.S. PATENT DOCUMENTS

| | | | |
|---|---|---|---|
| 2006/0056498 A1 | 3/2006 | Clancy | |
| 2006/0091928 A1* | 5/2006 | Kapur | G06F 1/06 327/298 |
| 2006/0259801 A1* | 11/2006 | Chu | G06F 1/3203 713/300 |
| 2006/0262613 A1* | 11/2006 | Braun | G11C 7/22 365/193 |
| 2007/0086267 A1* | 4/2007 | Kwak | G11C 7/02 365/233.1 |
| 2007/0234100 A1 | 10/2007 | Baker | |
| 2007/0268180 A1* | 11/2007 | Zhi | G01S 19/23 342/357.62 |
| 2008/0082279 A1* | 4/2008 | Ashburn | G06F 1/14 702/85 |
| 2009/0077405 A1* | 3/2009 | Johansen | H04W 52/0254 713/323 |
| 2009/0161453 A1 | 6/2009 | Giovannini | |
| 2009/0219203 A1* | 9/2009 | van Diggelen | G01S 19/28 342/357.67 |
| 2009/0238560 A1* | 9/2009 | Tesler | H04B 10/0731 398/25 |
| 2010/0013530 A1* | 1/2010 | Kim | H03K 5/1565 327/149 |
| 2010/0128538 A1* | 5/2010 | Watanabe | G01R 31/3191 365/189.05 |
| 2010/0171529 A1* | 7/2010 | Chatterjee | G01R 31/31709 327/31 |
| 2010/0293406 A1* | 11/2010 | Welker | G06F 13/1689 713/401 |
| 2011/0136475 A1* | 6/2011 | Jung | G06F 1/08 455/414.1 |
| 2011/0291753 A1* | 12/2011 | Ginsburg | H03F 3/005 330/7 |
| 2012/0109259 A1* | 5/2012 | Bond | A61N 1/025 607/60 |
| 2012/0112803 A1* | 5/2012 | Goh | G06F 1/24 327/142 |
| 2012/0139608 A1* | 6/2012 | Kao | H03K 17/04163 327/335 |
| 2013/0249612 A1* | 9/2013 | Zerbe | H04L 7/0079 327/161 |
| 2014/0086291 A1* | 3/2014 | Asmanis | H04B 17/12 375/224 |
| 2014/0145756 A1* | 5/2014 | Chong | H03K 19/177 326/40 |
| 2014/0195833 A1 | 7/2014 | Wang | |

FOREIGN PATENT DOCUMENTS

| | | |
|---|---|---|
| CN | 101482762 A | 7/2009 |
| CN | 101989466 A | 3/2011 |
| CN | 102118188 A | 7/2011 |
| CN | 102347081 A | 2/2012 |
| TW | I226755 B | 1/2005 |

* cited by examiner

APPARATUS AND METHOD FOR CONTROLLING CONTROLLABLE CLOCK SOURCE TO GENERATE CLOCK SIGNAL WITH FREQUENCY TRANSITION

CROSS REFERENCE TO RELATED APPLICATION

This is a divisional application of co-pending U.S. application Ser. No. 14/325,368 filed on Jul. 8, 2014, which claims the benefit of U.S. provisional application No. 61/858,742 filed on Jul. 26, 2013. The entire contents of related applications, including U.S. application Ser. No. 14/325,368 and U.S. provisional application No. 61/858,742, are incorporated herein by reference.

BACKGROUND

The disclosed embodiments of the present invention relate to changing a clock frequency of a clock signal used by a clock-driven device, and more particularly, to an apparatus and method for controlling a controllable clock source to generate a clock signal with a frequency transition under a condition that the controllable clock source stays in a frequency-locked state.

A memory device is a key component of an electronic device. For example, the memory device may include a dynamic random access memory (DRAM) used to buffer instructions and data. The computational workload of the electronic device is not always high. If the memory device is operated at a highest clock frequency under a normal mode, this would result in higher power consumption. The conventional power management design may change the clock frequency of the memory clock when the computational workload of the electronic device is lower than a threshold. The reduced clock frequency also enables the supply voltage to be reduced, which decreases power consumption and extends battery life (if the electronic device is a portable device powered by a battery).

In general, the memory clock is generated from a clock generator, such as a phase-locked loop (PLL). When the clock frequency of the memory device is allowed to be reduced, the memory controller controls the memory device to enter a self-refresh mode, and then adjusts the PLL so as to change the clock frequency of the memory clock. However, when an input of the PLL has a significant frequency change, the memory clock generated from the clock generator may fail to swiftly track the frequency variation of the PLL input. Thus, the PLL leaves a frequency-locked state. The generation of the memory clock is not stable until the PLL enters the frequency-locked state again. However, the PLL needs a period of time to enter the frequency-locked state again to provide a stable memory clock with the reduced clock frequency. As a result, the system is unable to access the memory device before the PLL provides a stable memory clock with the reduced clock frequency and the memory device leaves the self-refresh mode. If there is a real-time task that needs to access the memory device at a moment that access of the memory device is unavailable due to frequency change, the real-time task fails to work normally, which may lead to system malfunction.

SUMMARY

In accordance with exemplary embodiments of the present invention, an apparatus and method for controlling a controllable clock source to generate a clock signal with a frequency transition under a condition that the controllable clock source stays in a frequency-locked state are proposed to solve the above-mentioned problem.

According to an aspect of the present invention, an exemplary electronic device is provided. The exemplary electronic device includes a memory controller and a processor. The memory controller is configured to control access of a memory device. The processor is configured to perform a calibration operation to find a first setting range of a memory controller parameter under a first clock frequency of the memory device, find a second setting range of the memory controller parameter under a second clock frequency of the memory device, and determine a calibrated setting of the memory controller parameter according to an overlapped range of the first setting range and the second setting range.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The key idea is to make a memory device (e.g., DRAM or any other memory device driven by a clock) still accessible to a system when a clock generator is changing a clock frequency of the memory device. For example, a frequency hopping scheme may be employed by the clock generator to generate a clock signal having a piecewise/smooth frequency transition. As the frequency hopping scheme can prevent the clock generator from leaving a frequency-locked state, the clock generator is capable of outputting a frequency-locked clock signal. In addition, the internal clock circuitry of the memory device is able to track the frequency variation of the clock signal generated from the clock generator, such that the memory device can work normally during the frequency change period. In this way, the real-time tasks would work normally during the procedure of changing the clock frequency of the memory clock. Preferably, the reduced clock frequency may also enable the supply voltage to be reduced, which achieves better power saving performance. Further details of technical features of the present invention are described as below.

Figure 1:
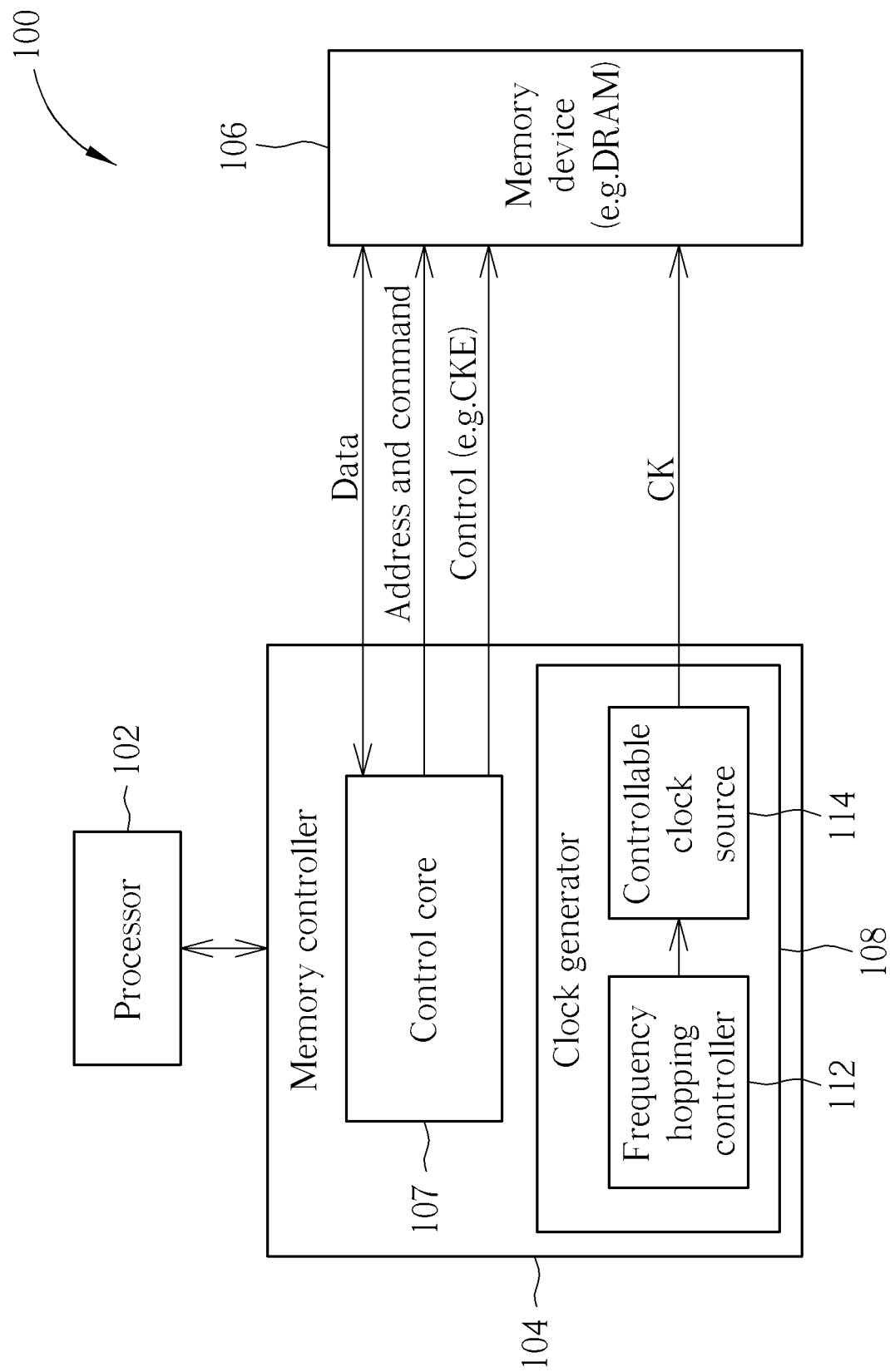
FIG. 1 is a block diagram illustrating an electronic device according to an embodiment of the present invention.

FIG. 1 is a block diagram illustrating an electronic device according to an embodiment of the present invention. By way of example, but not limitation, the electronic device 100 may be a mobile phone using the proposed frequency hopping scheme to change a memory clock frequency for power saving. The electronic device 100 can also be a tablet, wearable device, notebook or any other electronic device having or being coupled to a memory device. As shown in FIG. 1, the electronic device 100 may include a processor 102, a memory controller 104 and a memory device (e.g., DRAM or any other memory device driven by a clock) 106. The memory controller 104 may include a control core 107 and a clock generator 108. The memory controller 104 may be configured to control access (i.e., read and write) of the memory device 106. Hence, the processor 102 may issue a read request to the memory controller 104 for reading stored data from a read address of the memory device 106, and issue a write request to the memory controller 104 for writing input data to a write address of the memory device 106. It should be noted that FIG. 1 only shows circuit components pertinent to technical features of the present invention. In practice, the electronic device 100 may include additional circuit components to achieve its designated functionality.

The control core 107 of the memory controller 104 may be responsible for serving read requests and write requests issued from other circuit components (e.g., processor 102) in the electronic device 100. Specifically, the control core 107 may communicate with the memory device 106 via data signals, address and command signals and control signals. For example, the data signals may include a data strobe (DQS) signal, a data strobe complement (DQS #) signal, a data (DQ) signal, etc. The address and command signals may include a bank address (BA) signal, an address (ADDR) signal, and command inputs such as a row address strobe (RAS) signal, a column address strobe (CAS) signal, a write enable (WE) signal, etc. The control signals may include a clock enable (CKE) signal, a chip select (CS) signal, an on-die termination (ODT) signal, etc. As a person skilled in the art should readily understand details of above-mentioned signals, further description is omitted here for brevity.

The memory device 106 may be a clock-driven device, and thus requires a clock signal CK to perform its designated functionality. In this embodiment, the clock generator 108 may include a frequency hopping controller 112 and a controllable clock source 114. The frequency hopping controller 112 is shown as part of the memory controller 104. However, this is not meant to be a limitation of the present invention. Alternatively, the frequency hopping controller 112 may be implemented in a different circuit block, such as a baseband (BB) chip. That is, the frequency hopping controller 112 may be an external component of the memory controller 104. Hence, the clock generator 108 proposed by the present invention may be configured to include an internal component of the memory controller 104 (e.g., controllable clock source 114) and an external component of the memory controller 104 (e.g., frequency hopping controller 112). This alternative design also falls within the scope of the present invention. In the following, technical features of the proposed clock generator 108 are detailed based on the exemplary architecture shown in FIG. 1.

The controllable clock source 114 may be configured to generate the clock signal CK to the memory device 106. For example, the controllable clock source 114 may be implemented using a phase-locked loop (PLL) which acts as a frequency synthesizer. The frequency hopping controller 112 may be coupled to the controllable clock source 114, and may be configured to control the controllable clock source 114 to set the clock frequency of the clock signal CK. When the computational workload of the electronic device 100 is low, the clock signal CK may be controlled to have a reduced clock frequency for power saving. In this case, the frequency hopping controller 112 may be operative to make the clock signal CK have at least one frequency transition from one clock frequency (e.g., a highest clock frequency supported by the memory device 106) to another clock frequency (e.g., a lower clock frequency supported by the memory device 106), wherein the controllable clock source 114 stays in a frequency-locked state during a time period of the at least one frequency transition. As the frequency hopping controller 112 can prevent the controllable clock source 114 from leaving the frequency-locked state, the controllable clock source 114 does not need to spend additional time on re-entering the frequency-locked state to generate a frequency-locked clock.

Figure 2:
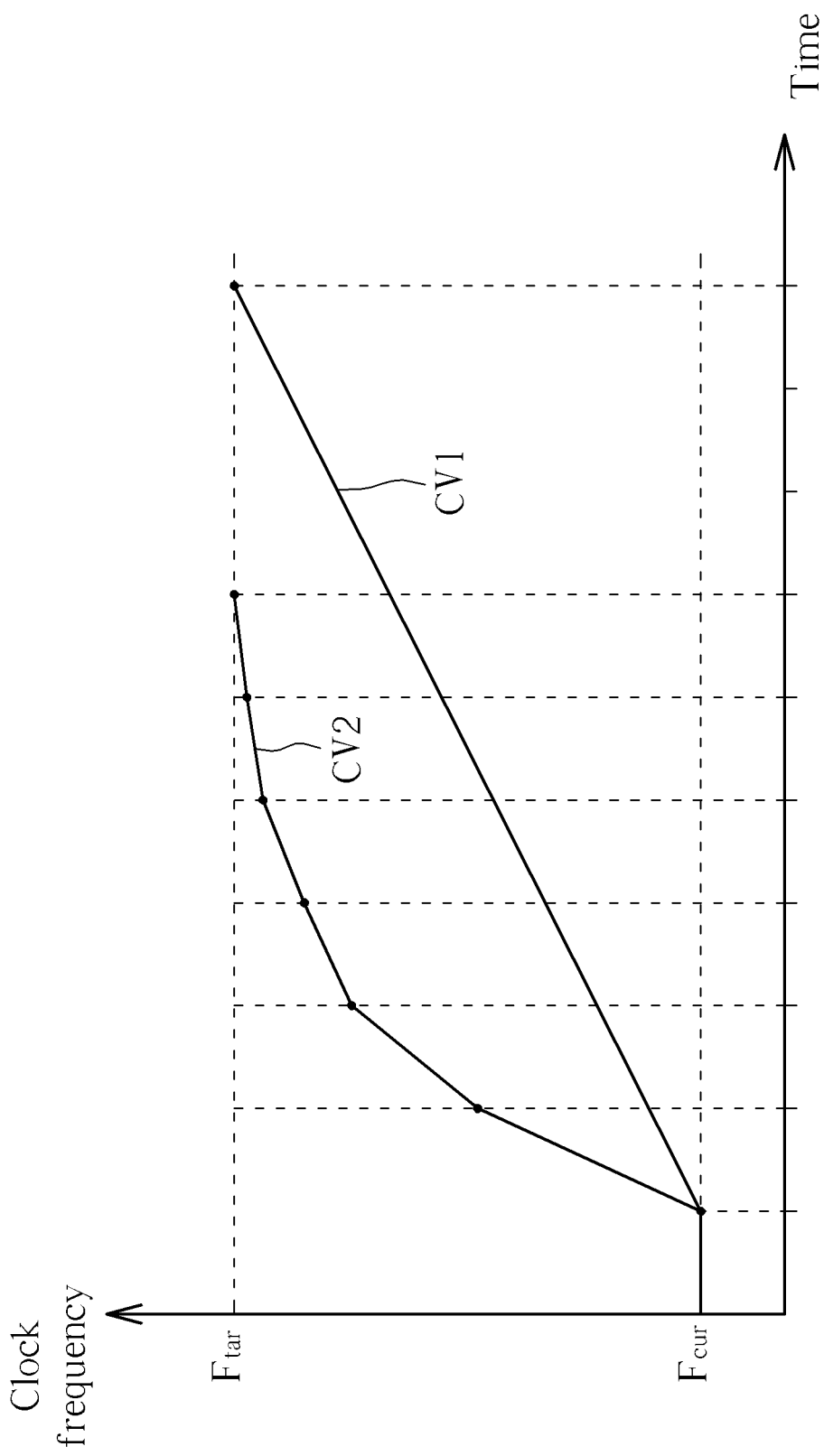
FIG. 2 is a diagram illustrating dynamic frequency scaling with frequency hopping controlled by the frequency hopping controller shown in FIG. 1.

In one exemplary frequency hopping design, the frequency hopping controller 112 may be configured to employ dynamic frequency scaling (DFS) to control a frequency transition of the clock signal CK. FIG. 2 is a diagram illustrating DFS with frequency hopping controlled by the frequency hopping controller 112 shown in FIG. 1. The frequency transition from a current clock frequency Fcur to a target clock frequency Ftar may be a smooth frequency transition as represented by the characteristic curve CV1 with a constant slope. To speedup the frequency transition from the current clock frequency Fcur to the target clock frequency Ftar, the clock signal CK may be controlled by DFS to have a piecewise frequency transition as represented by the characteristic curve CV2 with different slopes. In this example, the absolute value of the initial slope is set by a large value to quickly change the clock frequency in a short time, thus shortening the processing time needed for changing the clock frequency from Fcur to Ftar. It should be noted that the initial slope should be properly controlled to keep the controllable clock source 114 still staying in the frequency-locked state. Next, the absolute value of the slope is gradually reduced to make the clock frequency approach Ftar without undesired overshoot. During a period in which the clock frequency changes with time, the frequency hopping controller 112 can prevent the clock frequency from having a sudden frequency jump that exceeds a frequency variation threshold, thereby keeping the controllable clock source 114 staying in the frequency-locked state.

It should be noted that any of the smooth frequency transition or the piecewise frequency transition should be properly controlled to ensure that the controllable clock source 108 stays in the frequency-locked state. FIG. 2 illustrates a smooth/piecewise frequency transition from a low clock frequency to a high clock frequency. However, the same DFS-based frequency hopping concept may be employed by the frequency hopping controller 112 to make the clock signal CK have a smooth/piecewise frequency transition from a high clock frequency to a low clock frequency. Further description is omitted here for brevity.

Figure 3:
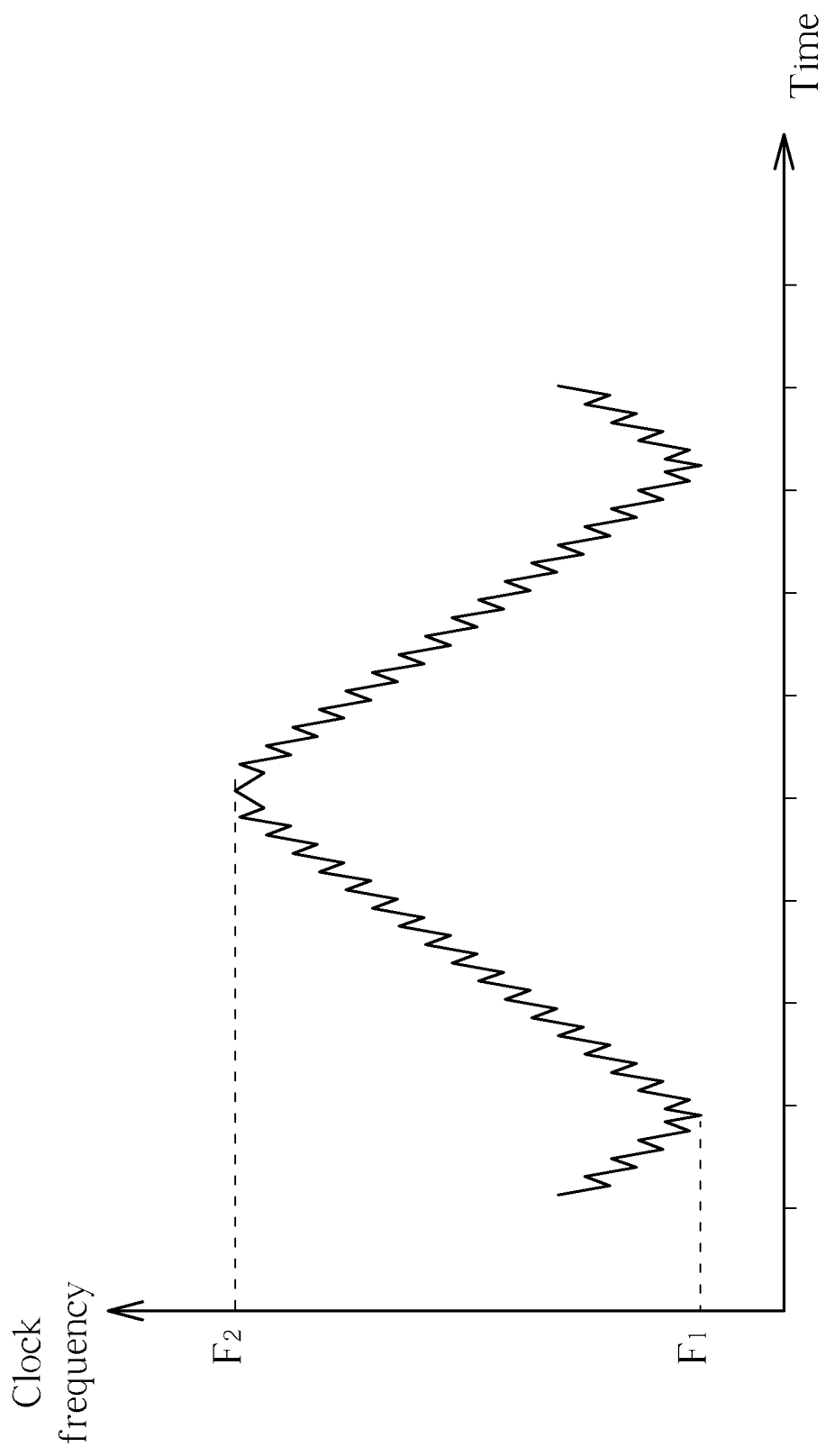
FIG. 3 is a diagram illustrating spread spectrum clocking with frequency hopping controlled by the frequency hopping controller shown in FIG. 1.

In another exemplary frequency hopping design, the frequency hopping controller 112 may be configured to employ spread spectrum clocking (SSC) to control consecutive frequency transitions of the clock signal CK. FIG. 3 is a diagram illustrating SSC with frequency hopping controlled by the frequency hopping controller 112 shown in FIG. 1. The frequency hopping controller 112 may apply a free-run mode control to the controller clock source 114, such that the clock signal CK changes its clock frequency back and forth between a first clock frequency F1 and a second clock frequency F2. In other words, the clock frequency of the clock signal CK gradually moves from the first clock frequency F1 to the second clock frequency F2 and gradually moves from the second clock frequency F2 to the first clock frequency F1, alternatively. In this embodiment, the second clock frequency F2 is the highest clock frequency supported by the memory device 106, and the first clock frequency F1 is generated by modulating the second clock frequency F2 based on a triangle waveform. For example, when the SSC amplitude is set by 8%, F1=(1−8%)*F2.

In a first scenario, the frequency hopping controller 112 may control the controllable clock source 114 to make the clock signal CK have a frequency transition when a clock enable (CKE) control signal of the memory device 106 is asserted (i.e., CKE=1). Thus, the DFS/SSC processing of the clock signal CK is performed in the background so the memory device 106 can still be accessed at run-time. As the frequency hopping controller 112 prevents the controllable clock source 114 from leaving the frequency-locked state, the clock frequency of the clock signal CK does not have a significant frequency change, thus allowing the internal clock circuitry of the memory device 106 to swiftly track the frequency variation of the clock signal CK. In this way, the memory device 106 can still operate normally during the frequency change period. For example, the memory device 106 may be a DRAM, and the clock signal CK may be controlled to have a frequency transition from 1600 MHz to 1066 MHz for power saving.

Further, the memory controller 104 may use the same set of memory timing parameters when the clock signal CK of the memory device 106 has a transition from one clock frequency to another clock frequency. In one exemplary design, a boot-time calibration operation may be performed by the processor 102 to calibrate at least one memory controller parameter when the electronic device 100 is booted up, and a run-time tracking operation may be performed by the memory controller 104 to dynamically adjust the at least one memory controller parameter when the clock frequency of the clock signal CK is being adjusted by the proposed frequency hopping scheme. For example, the memory controller parameters checked by the boot-time calibration operation may include a data strobe (DQS) gating window and a data latch (DATLAT) time. In addition, the boot-time calibration operation may further check inherent characteristics of the memory device 106, such as a skew value tDQSCK between the data strobe (DQS) signal and the clock signal CK of the memory device 106.

Figure 4:
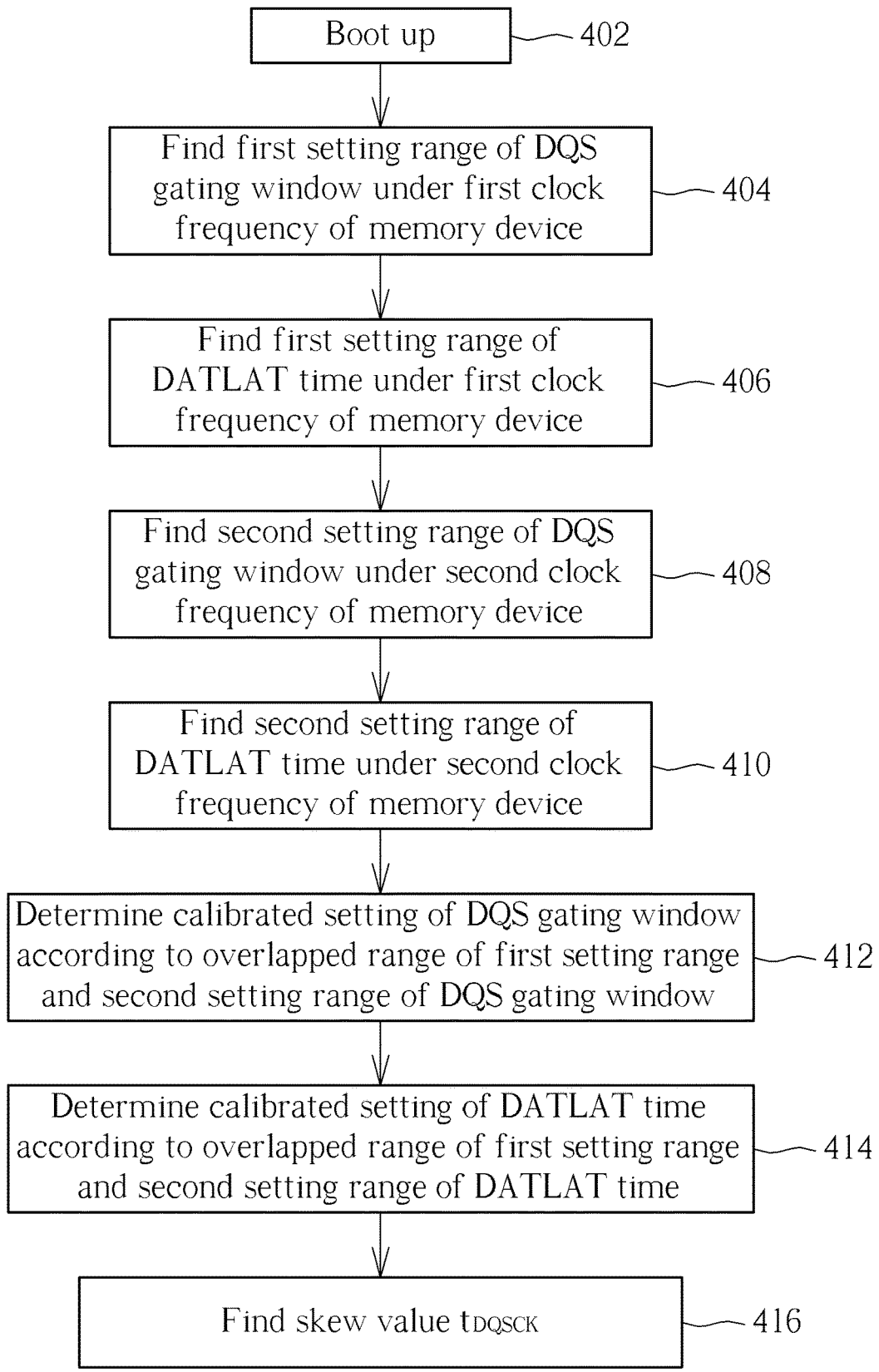
FIG. 4 is a flowchart illustrating a boot-time calibration operation according to an embodiment of the present invention.

FIG. 4 is a flowchart illustrating a boot-time calibration operation according to an embodiment of the present invention. Provided that the result is substantially the same, the steps are not required to be executed in the exact order shown in FIG. 4. Besides, one or more steps may be omitted according to different embodiments of this invention. For example, a portion or all of steps 406, 410 and 414 may be omitted in some embodiments. The boot-time calibration operation may be performed by the processor 102 running program codes of a calibration software module, and may be briefly summarized as below.

Step 402: The electronic device 100 is booted up.

Step 404: Find a first setting range of the DQS gating window under a first clock frequency of the memory device 106. For example, the first clock frequency is a lowest clock frequency of a frequency transition of the clock signal CK, or a clock frequency lower than a nominal clock frequency of the memory device 106.

Step 406: Find a first setting range of the DATLAT time under the first clock frequency of the memory device 106.

Step 408: Find a second setting range of the DQS gating window under a second clock frequency of the memory device 106. For example, the second clock frequency is a highest clock frequency of the frequency transition of the clock signal CK, or a highest clock frequency (i.e., a nominal clock frequency) supported by the memory device 106.

Step 410: Find a second setting range of the DATLAT time under the second clock frequency of the memory device 106.

Step 412: Determine a calibrated setting of the DQS gating window according to an overlapped range of the first setting range of the DQS gating window and the second setting range of the DQS gating window.

Step 414: Determine a calibrated setting of the DATLAT time according to an overlapped range of the first setting range of the DATLAT time and the second setting range of the DATLAT time.

Step 416: Find the skew value tDQSCK between the data strobe (DQS) signal and the clock signal CK of the memory device 106. For example, the skew value tDQSCK may be evaluated under the second clock frequency of the memory device 106.

In step 412, an overlapped range of the first setting range of the DQS gating window and the second setting range of the DQS gating window may be checked to fine tune the setting of the DQS gating window. In this way, the calibrated setting of the DQS gating window is capable of meeting the requirement of eliminating signal noise and/or undesirable signal regions of the DQS signal generated under any of the first clock frequency and the second clock frequency.

In step 414, an overlapped range of the first setting range of the DATLAT time and the second setting range of the DATLAT time is checked to fine tune the setting of the DATLAT time. In this way, the calibrated setting of the DATLAT time is capable of meeting the read data margin requirement of holding the read data coming from the memory device 106 due to a read operation performed under any of the first clock frequency and the second clock frequency.

After the boot-time calibration operation is completed, the electronic device 100 may enter a normal mode to perform its designated functionality. Initially, the memory controller 104 may be configured based on the boot-time calibration result, and may generate the clock signal CK with the nominal clock frequency of the memory device 106 (i.e., the highest clock frequency supported by the memory device 106). When a condition of reducing the memory clock frequency is met, the frequency hopping controller 112 may control the controllable clock source 114 to make the clock signal CK have the transition from the highest clock frequency supported by the memory device 106 to a lower clock frequency supported by the memory device 106. Further, a run-time tracking mechanism is activated to dynamically adjust the memory controller parameters (e.g., DQS gating window and/or DATLAT time) during the time period of the frequency transition. This may enable the memory device 106 to be correctly accessed in different clock frequencies.

The skew value tDQSCK between the DQS signal and the clock signal CK of the memory device 106 may be referenced by the frequency hopping controller 112 to control frequency hopping of the controllable clock source 114. In one embodiment, the frequency transition from one clock frequency to another clock frequency may be set based on the skew value tDQSCK. For example, when the skew value tDQSCK has a smaller value, the clock signal CK may be allowed to have a larger frequency transition from 1600 MHz to 1066 MHz; and when the skew value tDQSCK has a larger value, the clock signal CK may only be allowed to have a smaller frequency transition from 1600 MHz to 1466 MHz. In other words, the skew value tDQSCK may be referenced by the frequency hopping controller 112 to decide the frequency transition range, such that the memory device 106 can still work normally when the memory clock frequency is adjusted.

In a worst case where the skew value tDQSCK is larger than a predetermined threshold, the frequency hopping function may be disabled. For example, the frequency hopping controller 112 may be further configured to compare the skew value tDQSCK with the predetermined threshold, and disable the frequency hopping of the controllable clock source 114 when a comparison result indicates that the skew value tDQSCK is larger than the predetermined threshold.

In above embodiments, frequency hopping of the controllable clock source 114 is active when the clock enable (CKE) control signal of the memory device 106 is asserted (i.e., CKE=1). Further, the frequency hopping of the controllable clock source 114 may be active when the low-active chip select (CS) signal is asserted (i.e., CS=0). The memory device 106 is allowed to be accessed during the frequency change period. If there is a real-time task that needs to access the memory device 106 at this moment, the real-time task can work normally. However, this is for illustrative purposes only, and is not meant to be a limitation of the present invention. In an alternative design, the frequency hopping controller 112 may control the controllable clock source 114 to make the clock signal CK have a frequency transition when the clock enable (CKE) control signal of the memory device 106 is de-asserted (i.e., CKE=0). This also falls within the scope of the present invention.

In above embodiments, the clock generator 108 is implemented in the electronic device 100 to provide the clock signal CK to the memory device (e.g., DRAM or any other memory device driven by a clock) 106. However, this is not meant to be a limitation of the present invention. Any electronic device using the proposed clock generator 108 to provide a clock signal to a clock-driven device falls within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device, comprising:
   a memory controller, configured to control access of a memory device; and
   a processor, configured to perform a calibration operation to find a first setting range of a memory controller parameter under a first clock frequency of the memory device, find a second setting range of the memory controller parameter under a second clock frequency of the memory device, and determine a calibrated setting of the memory controller parameter according to an overlapped range of the first setting range and the second setting range, wherein the first clock frequency is different from the second clock frequency.

2. The electronic device of claim 1, wherein the memory controller parameter is a data strobe (DQS) gating window.

3. The electronic device of claim 1, wherein the memory controller parameter is a data latch (DATLAT) time.

* * * * *